US011154831B2

(12) United States Patent
De Broqueville et al.

(10) Patent No.: US 11,154,831 B2
(45) Date of Patent: Oct. 26, 2021

(54) DEVICE FOR TREATING PARTICLES IN A ROTATING FLUIDIZED BED

(71) Applicant: Universite Catholique de Louvain, Louvain-la-Neuve (BE)

(72) Inventors: Axel De Broqueville, Grez-Doiceau (BE); Juray De Wilde, Louvain-la-Neuve (BE); Thomas Tourneur, Louvain-la-Neuve (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 11 days.

(21) Appl. No.: 16/609,593

(22) PCT Filed: May 1, 2018

(86) PCT No.: PCT/NL2018/050284
§ 371 (c)(1),
(2) Date: Oct. 30, 2019

(87) PCT Pub. No.: WO2018/203745
PCT Pub. Date: Nov. 8, 2018

(65) Prior Publication Data
US 2020/0061568 A1  Feb. 27, 2020

(30) Foreign Application Priority Data

May 1, 2017 (EP) ..................................... 17168898

(51) Int. Cl.
*B01J 8/38* (2006.01)
*B05C 19/02* (2006.01)
(Continued)

(52) U.S. Cl.
CPC ............... *B01J 8/386* (2013.01); *B01J 8/004* (2013.01); *B01J 8/0055* (2013.01); *B01J 8/14* (2013.01);
(Continued)

(58) Field of Classification Search
USPC ............... 118/303, 308, 309, 58, 62, 19, 24
See application file for complete search history.

(56) References Cited

U.S. PATENT DOCUMENTS 9,751,064 B2 * 9/2017 De Wilde .................. B01J 8/36
2010/0197879 A1   8/2010 De Broqueville et al.

FOREIGN PATENT DOCUMENTS

WO   2014065668 A1   5/2014

OTHER PUBLICATIONS

International Search Report dated Jul. 11, 2018, for International Patent Application No. PCT/NL2018/050284.

* cited by examiner

*Primary Examiner* — Yewebdar T Tadesse
(74) *Attorney, Agent, or Firm* — Karceski IP Law, PLLC

(57) ABSTRACT

Device for treating particles having a vortex chamber defined by end walls at both ends and a circular wall, a rotation imparting device with a fluid feeder arranged in a mainly tangential direction, a particle outlet and a central fluid outlet, an auxiliary chamber coaxially arranged with the vortex chamber defining a treating zone, which auxiliary chamber has a circular outer wall and an end wall and opens into the vortex chamber through an opening in the end wall of the vortex chamber opposite the central fluid outlet, a device for injecting particles coaxially into the treating zone, and a device for feeding a treating fluid into the treating zone in mainly axial direction, wherein the ratio of the area of the opening to the cross-sectional area of the vortex chamber is less than 0.50.

20 Claims, 4 Drawing Sheets

(51) Int. Cl.
  *B01J 8/00* (2006.01)
  *B01J 8/14* (2006.01)
  *B01J 8/36* (2006.01)
  *B01J 8/44* (2006.01)
  *B05C 19/00* (2006.01)

(52) U.S. Cl.
  CPC ................ *B01J 8/36* (2013.01); *B01J 8/382* (2013.01); *B01J 8/44* (2013.01); *B05C 19/00* (2013.01); *B05C 19/02* (2013.01); *B01J 2208/00929* (2013.01); *B01J 2208/00938* (2013.01)

DEVICE FOR TREATING PARTICLES IN A ROTATING FLUIDIZED BED

CROSS-REFERENCE TO RELATED APPLICATION(S)

This is a National Stage Entry into the United States Patent and Trademark Office from International PCT Patent Application No. PCT/NL2018/050284, having an international filing date of May 1, 2018, which claims priority to European Patent Application No. 17168898.9, filed on May 1, 2017, the entire contents of both of which are incorporated herein by reference.

FIELD OF THE INVENTION

The present invention relates to a device for treating particles in a vortex chamber with, preferably, a rotating fluidized bed. In the specification and in the claims, the word 'particle' will be used to refer to a particle and to a precursor of a particle, such as a liquid droplet.

Such a device is particularly suitable for coating particles and for spray drying of particle precursors. An example of the latter application is spray drying of milk to produce milk powder.

BACKGROUND OF THE INVENTION

International patent application publication No. WO 2014/065 668 (WO '668) discloses a device for treating particles in a vortex chamber with a rotating fluidized bed, which device comprises a cylindrical housing provided with end walls at both ends enclosing a treating zone and a finishing and separation zone, a device for injecting particles into the treating zone, a primary rotation imparting device, a secondary rotation imparting device, a particle outlet and a central fluid outlet.

The device for injecting particles comprises a nozzle that injects during normal operation particles into the treating zone.

The primary rotation imparting device imparts during normal operation a rotational motion about the central longitudinal axis of the cylindrical housing to the particles in the treating zone. The primary rotation imparting device comprises a plurality of fluid injectors distributed around the cylindrical outer wall of the housing. The fluid injectors consist of overlapping vanes with long narrow openings or slits between them, which slits are arranged under an acute angle with a tangent to the outer wall for tangentially feeding treating fluid to the treating zone.

The secondary rotation imparting device imparts during normal operation a rotational motion to the particles in the finishing and separation zone, generating a centrifugal force that causes the particles to move in a radial direction towards the cylindrical outer wall. This secondary rotation imparting device comprises a plurality of fluid injectors distributed around the cylindrical outer wall of the housing. The fluid injectors consist of overlapping vanes with slits between them, which slits are arranged under an acute angle with a tangent to the outer wall for tangentially feeding secondary fluid to the finishing and separation zone.

During normal operation, particles to be treated are injected into the treating zone through the device for injecting particles. Treating fluid is supplied through the slits of the primary rotation imparting device at such a rate that the treating fluid flowing through the slits imparts a rotational motion to the particles in the treating zone.

The particles are allowed to move in axial direction from the treating zone into the finishing and separation zone. In this zone the particles are contacted with a secondary fluid. The secondary fluid is supplied through the slits of the secondary rotation imparting device to impart a rotational motion to the particles in the finishing and separation zone. The direction of the imparted rotation is the same as the direction of the rotation in the treating zone. The rotation imparted to the particles in the finishing and separation zone causes the particles to move in radial direction towards outer wall of the housing, where they gather to form a dense rotating fluidized bed. The particles are allowed to leave the finishing and separation zone through the particle outlet.

The treating fluid and the secondary fluid, substantially free from particles, exit the device through the central fluid outlet.

The known device is provided with a baffle in the form of a circular or annular plate arranged between the zones. The circular plate is so designed that there is an annular slit between the rim of the plate and the wall of the housing for allowing passage of treated particles. The baffle may further be provided with a central opening for the passage of fluid. In addition, a central outlet tube may be provided that extends from the treating zone into the central fluid outlet.

The device disclosed in WO '668 is an improvement over the prior art devices described in WO '668. However, unfortunately, tests with drying particle precursors revealed that the quality of the drying particles was not as good as expected: a substantial part of the particles remained too wet, and the wet particles adhered to the vanes of the rotation imparting device in the treating zone.

A careful examination of the operation of the device, which included measuring temperature profiles, revealed that during normal operation secondary fluid passes from the finishing and separation zone into the treating zone. The secondary fluid is normally colder than the treating fluid, for the reason that one does not want the particles to be subjected too long to relatively high temperatures. Thus the colder secondary fluid can enter into the treating zone and this adversely affects the quality of the particles. This secondary fluid entrains particles that are so returned into the treating zone where they can adhere to the hot vanes. Without limiting ourselves to a particular theory, it is assumed that differences between the pressure in the treating zone and that in the finishing and separation zone generate axial and radial refluxes causing the secondary fluid and treated particles to move into the treating zone.

The baffles as disclosed in WO '668 did not sufficiently hinder the flow of secondary fluid into the treating zone, as secondary fluid could still flow through the annular slit or the central opening.

It is therefore an object of the present invention to provide a device for treating particles wherein the flow of secondary fluid into the treating zone is effectively prevented, without adversely affecting treating the particles.

SUMMARY OF THE INVENTION

To this end, the device for treating particles according to the present invention comprises a vortex chamber defined by end walls at both ends and a circular wall, a rotation imparting device comprising fluid feeding means arranged in a mainly tangential direction, a particle outlet and a central fluid outlet, which device further comprises an auxiliary chamber coaxially arranged with the vortex chamber defining a treating zone, which auxiliary chamber has a circular outer wall and an end wall and opens into the vortex chamber through an opening in the end wall of the vortex chamber opposite the central fluid outlet, a device for injecting particles coaxially into the treating zone, and a device for feeding a treating fluid into the treating zone in mainly axial direction, wherein the ratio of the area of the opening to the cross-sectional area of the vortex chamber is less than 0.50.

The invention further relates to a method for treating particles, wherein particles are treated in a device according to the invention. Such treatment may in particular be a coating treatment.

The invention further relates to a method for preparing particles using a device according to the invention. In particular, the particles may be prepared by spray-drying a particle precursor in a device according to the invention.

In the specification and the claims, the expression 'cross-sectional area of the vortex chamber' is used to refer to the cross-sectional area near the end wall of the vortex chamber provided with the opening.

BRIEF DESCRIPTION OF THE DRAWINGS

The invention will now be described by way of example in more detail with reference to the accompanying drawings, wherein.

DESCRIPTION OF EMBODIMENT(S) OF THE INVENTION

Figure 1:
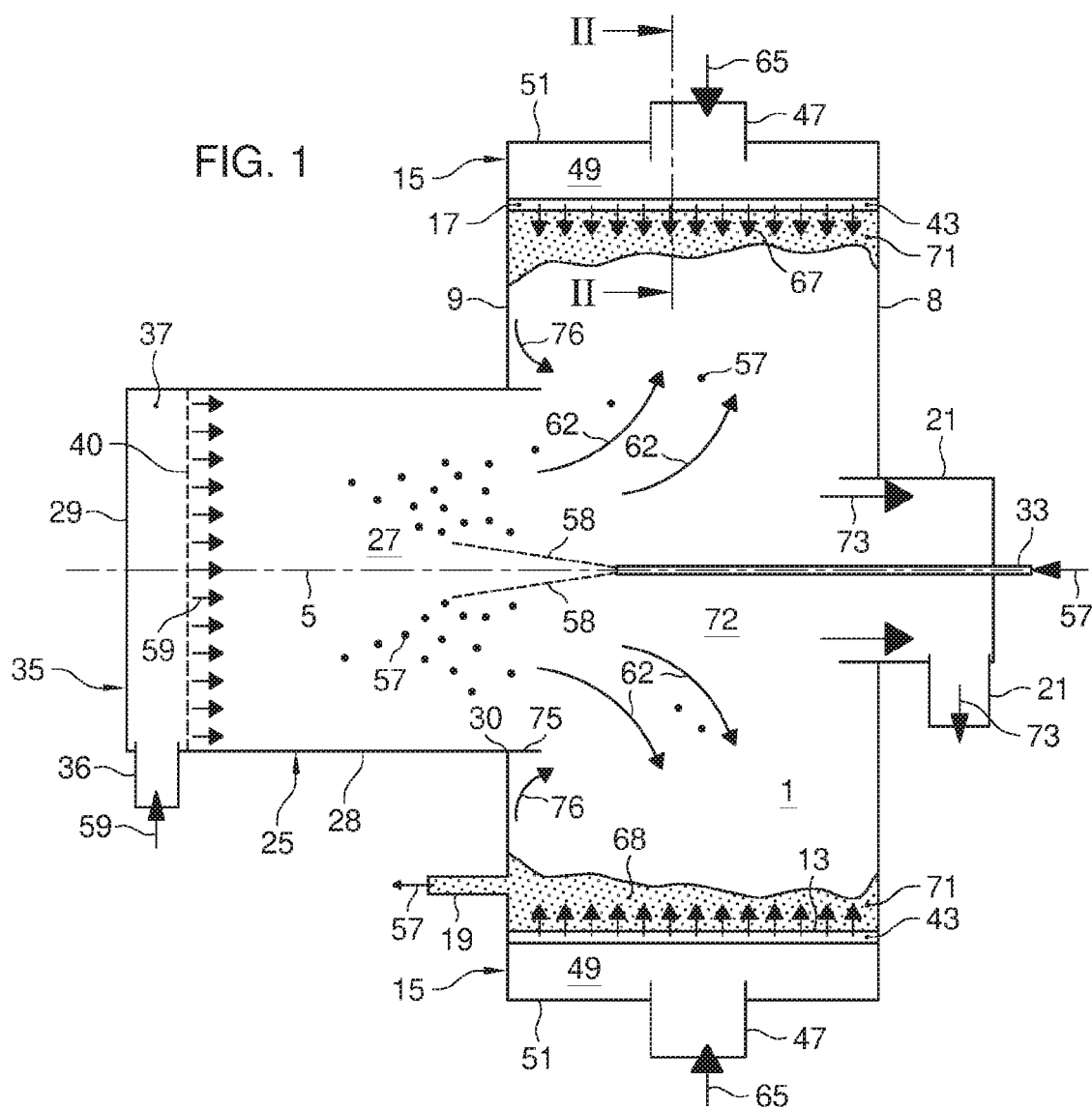
FIG. 1 shows a longitudinal section of a first embodiment of the invention wherein the particles to be treated are injected into the device in countercurrent flow with respect to the treating fluid.

Reference is now made to FIG. 1. FIG. 1 shows a longitudinal section of a first embodiment of the invention. The device for treating particles according to the present invention comprises a vortex chamber 1 having a central longitudinal axis 5. The vortex chamber 1 is defined by end walls 8 and 9 at both ends of the vortex chamber 1 and a circular wall 13.

The device further comprises a rotation imparting device 15 including fluid feeding means 17 arranged in a mainly tangential direction, and a particle outlet 19 and a central fluid outlet 21. The inner surface of the rotation imparting device 15 forms the circular wall 13 of the vortex chamber 1. The rotation imparting device 15 will be discussed in more detail with reference to FIG. 2.

The device further comprises an auxiliary chamber 25 coaxially arranged with the vortex chamber 1. The auxiliary chamber 25 defines a treating zone 27. The auxiliary chamber 25 has a circular outer wall 28, in this embodiment a cylindrical one, and an end wall 29, and it opens into the vortex chamber 1 through an opening 30 in the end wall 9 of the vortex chamber 1 opposite the central fluid outlet 21.

The device according to the invention further comprises a device 33 for injecting particles coaxially into the treating zone 27, and a device 35 for feeding a treating fluid into the treating zone 27 in mainly axial direction. The device 35 for feeding treating fluid into the treating zone 27 includes a fluid inlet 36 opening into a chamber 37, which chamber 37 is defined by the outer wall 28, the end wall 29 of the auxiliary chamber 25, and a distributor plate 40.

According to the invention, the ratio of the area of the opening 30 to the cross-sectional area of the vortex chamber 1 near the end wall 9 is less than 0.50.

Figure 2:
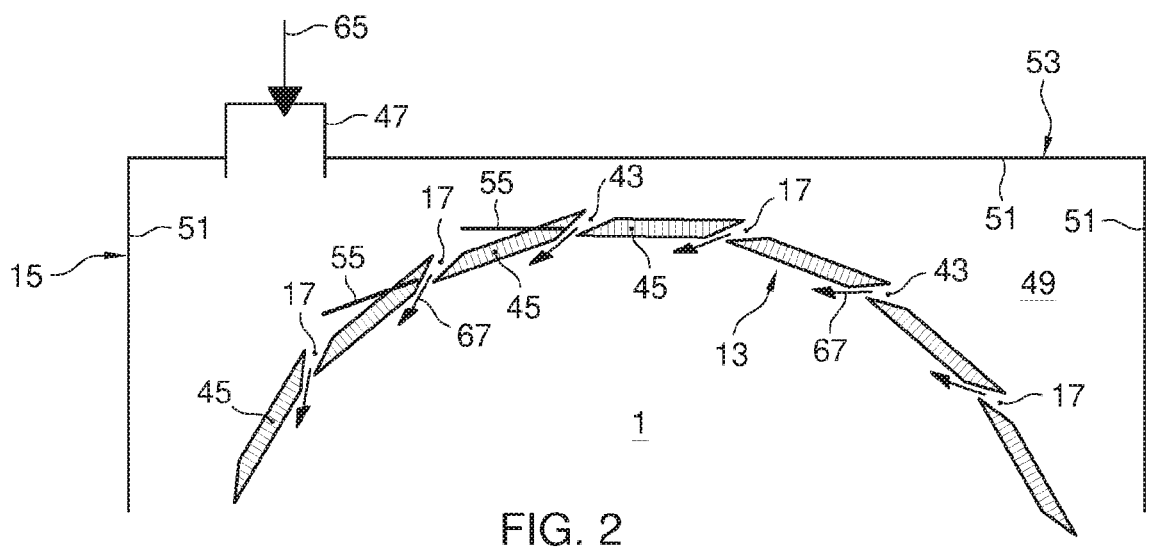
FIG. 2 shows a partial cross-section of the housing along the line II-II in FIG. 1, drawn not to the same scale.

Reference is now made to FIG. 2 showing in more detail the rotation imparting device 15, which is an inwardly facing rotation imparting device. The inwardly facing rotation imparting device 15 comprises the fluid feeding means 17 in the form of long narrow openings or slits 43 between overlapping vanes 45. To avoid clutter, not all fluid feeding means, slits and vanes have been referred to by means of their reference numerals. The overlapping vanes 45 form the inner surface of the inwardly facing rotation imparting device 15, and thus they form the circular wall 13 of the vortex chamber 1. The inwardly facing rotation imparting device 15 further comprises a fluid inlet 47 opening into a fluid distribution chamber 49 defined by the outer walls 51 of a housing 53 and the outer sides of the overlapping vanes 45. The fluid feeding means 17 are arranged in a mainly tangential direction, that is to say the angle between the fluid feeding means 17 and a tangent 55 at the relevant fluid feeding means 17 is less than 45°, so that during normal operation the tangential component of the fluid velocity is much larger than the other components of the fluid velocity. The radial component of the velocity of the fluid exiting the inwardly facing rotation imparting device 15 is directed towards the central longitudinal axis 5.

During normal operation, particles 57 are injected into the treating zone 27 through the device 33 for injecting particles coaxially into the treating zone 27 (dashed lines 58). Treating fluid 59 is supplied through the fluid inlet 36 of the chamber 37. Treating fluid 59 passing through the distributor plate 40 is distributed over the cross-section of the auxiliary chamber 25, and flows into the treating zone 27 in countercurrent flow with respect to the flow of particles 57 into the treating zone 27.

In the treating zone 27, the particles 57 are intensively mixed with the treating fluid 59 so as, for example, to dry oil-in-water emulsions, such as milk to obtain milk powder, where the treating fluid is a gas.

In order to finish treating the particles 57 and to separate the particles 57 from the fluid, the particles 57 are allowed to move into the vortex chamber 1 (arrows 62). Secondary fluid 65 (gas or liquid) is supplied through fluid inlet 47 to the fluid distribution chamber 49. The secondary fluid is injected into the vortex chamber 1 through the fluid feeding means 17 in the form of slits 43 in a direction indicated by arrows 67 and 68, respectively. Please note that because the fluid feeding means are arranged in a mainly tangential direction, the flow of secondary fluid is in a mainly tangential direction. The arrows 67 and 68 are directed out of the plane of drawing, where the arrows 67 point upwards and the arrows 68 point downwards. The flow of secondary fluid 65 into the vortex chamber 1 generates a vortex in the vortex chamber 1. The vortex causes the particles 57 to move in a rotational motion, which generates a centrifugal force that causes the particles 57 to move in a radial direction towards the circular wall 13 of the vortex chamber 1, which is in this case formed by the overlapping vanes 45 of the inwardly facing rotation imparting device 15. The particles 57 gather on the circular wall 13 to form a dense rotating fluidized bed 71 near the inwardly facing rotation imparting device 15. Thus the particles move from the treating zone 27 towards a central zone 72, or free vortex zone with few particles per unit volume, towards the dense rotating fluidized bed 71. In the central zone 72, both the treating fluid 59 and the secondary fluid 65 mix, so that the temperature of the resulting fluid is between that of the treating fluid and that of the secondary fluid. The residence time of the particles in the treating zone 27 and the central zone 72 of the vortex chamber 1, before they reach the rotating dense fluidized bed 71, is very short, of the order of milliseconds.

Treated particles 57 exit the device through the particle outlet 19, and fluid 73, treating fluid and secondary fluid, substantially free from particles, exits the device through the central fluid outlet 21. The distance of the particle outlet 19 to the circular wall 13 determines the residence time of the particles 57 in the dense rotating fluidized bed 71.

The device according to the present invention provides an excellent separation between on the one hand treating in the treating zone 27 and on the other hand finishing and separating in the vortex chamber 1. Moreover, because the treating zone 27 is defined by the auxiliary chamber 25 that opens into the vortex chamber 1 through the opening 30 with a relatively small area, the vortex generated by the secondary fluid will hardly affect the treating in the treating zone 27. In addition, the treating fluid 59 will flow in axial direction towards the central fluid outlet 21, so that it does not penetrate significantly into the dense rotating fluidized bed 71.

When the operating conditions require such flow rates of the treating fluid and of the secondary fluid that it is likely that secondary fluid will flow into the treating zone 27, the device can be provided with a rim 75 around the opening 30. The rim 75 will force the secondary fluid to flow towards the centre of the vortex chamber 1 (arrows 76).

Figure 3:
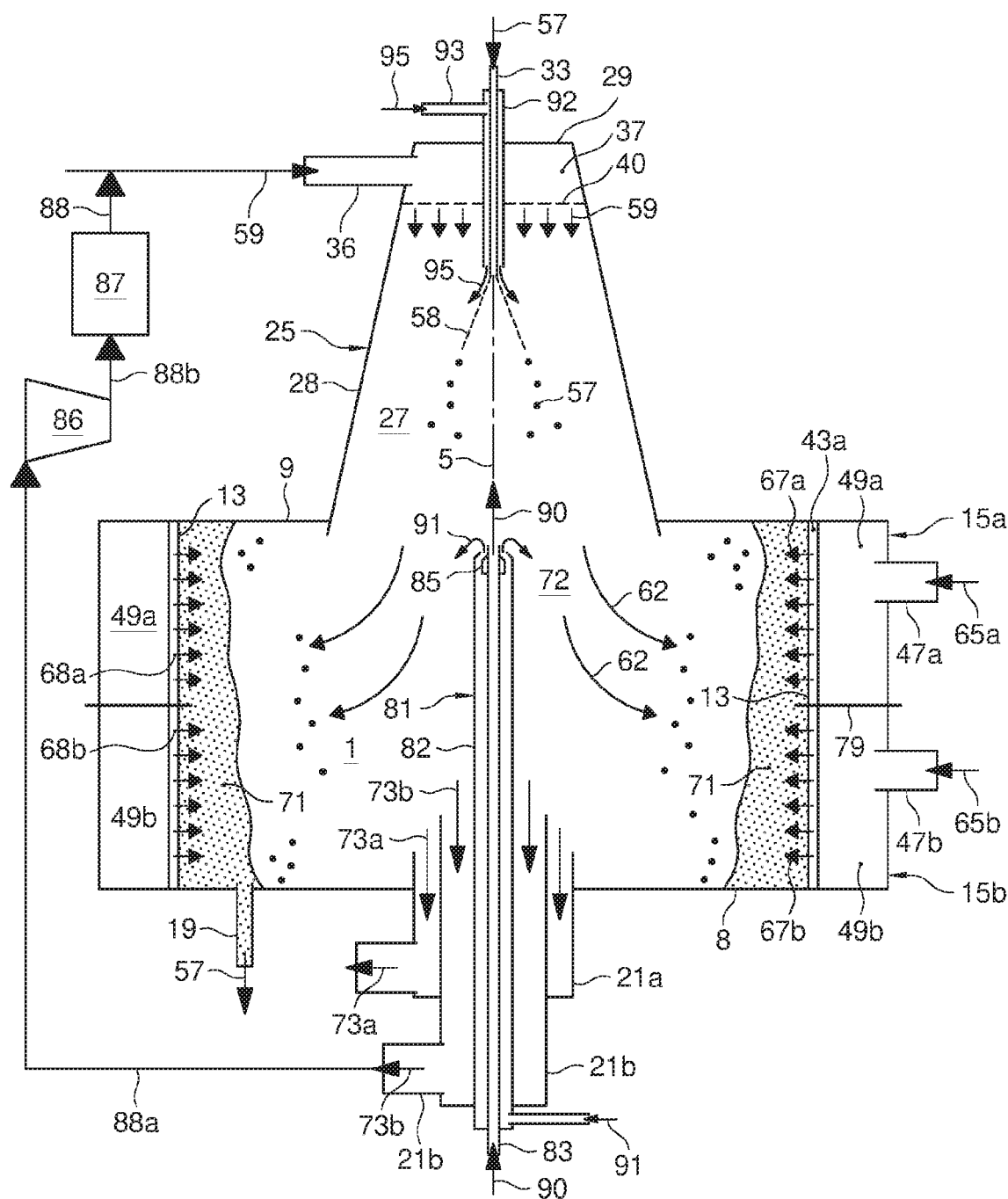
FIG. 3 shows a longitudinal section of a second embodiment of the invention wherein the particles to be treated are injected into the device in co-current flow with respect to the treating fluid.

Reference is now made to FIG. 3, which shows a second embodiment of the invention, wherein the particles to be treated are injected into the device in co-current flow with respect to the treating fluid, that is to say in the same direction as the treating fluid. Parts of the device already discussed with reference to FIG. 1 have the same reference numeral as in FIG. 1.

In addition, in the device shown in FIG. 3, the inwardly facing rotation imparting device is split into two sections, 15a and 15b. To this end the fluid distribution chamber comprises two sections, 49a and 49b separated by an annular plate 79. Moreover, the auxiliary chamber 25 is a frustum of a cone of which the outer wall 28 tapers in the direction from the opening 30 towards the end wall 29, and there are two concentric central fluid outlets, 21a and 21b.

In order to widen the flow of particles 57 injected into the treating zone 27 and to drive the particles 57 away from the central zone 72 around the central longitudinal axis 5, the device according to the invention is further provided with means 81 for widening the flow of particles, which extends centrally towards the treating zone 27 or into the treating zone 27. The means 81 for widening the flow of particles preferably comprises two concentric injection tubes 82 and 83 extending along the central longitudinal axis 5 and opening opposite the device 33 for injecting particles 57 into the treating zone 27. The means 81 is provided with a rotation imparting device 85. The rotation imparting device 85 can comprise grooves in an annular ring fixed between the injection tubes 82 and 83, vanes arranged near the tip of the means 81 in the annular space between the injection tubes 82 and 83, or a ring arranged in the annular space provided with fluid passages. The grooves, vanes or fluid passages are so arranged as to impart, during normal operation, a rotational motion to the fluid flowing through the annular space.

In addition, the device of FIG. 3 is provided with a system for recycling hot fluid from the central fluid outlet 21b, which comprises a compressor 86 and a heat exchanger 87 connected by means of conduits 88a, 88b and 88c connecting the fluid outlet 21b to the compressor 86, the compressor 86 to the heat exchanger 87 and the heat exchanger 87 to the fluid inlet 36, respectively.

During normal operation, particles 57 are injected into the treating zone 27 through the device 33 for injecting particles coaxially into the treating zone 27. Treating fluid 59 is introduced into the auxiliary chamber 25 through the distributor plate 40. In this embodiment treating fluid 59 flows in the same direction as the injected particles 57.

In order to drive the flow of particles 57 leaving the treating zone 27 away from the central zone 72 around the central longitudinal axis 5, a further fluid 90 can be injected in a direction opposite to the direction of the particles through the injection tube 83, and in addition, fluid 91 can be injected into the treating zone 27 through the annular space between the injection tubes 82 and 83. The rotation imparting device 85 imparts a rotational motion to the fluid 91 exiting the annular space. In this way the rotational motion in the central zone 72 of the vortex chamber 1 is increased and number of particles leaving the vortex chamber 1 through the central fluid outlet 21 is reduced.

The particles 57 in the treating zone 27 are intensively mixed with treating fluid 59. In order to finish treating the particles 57 and to separate the treated particles from the fluid, the particles are allowed to move into the vortex chamber 1. Secondary fluid 65a and 65b is supplied to the fluid inlets 47a and 47b and exits the inwardly facing rotation imparting device through the slits 43a and 43b so as to impart a rotation to the particles. The resulting centrifugal force causes the particles to move in a radial direction towards the circular wall 13 of the vortex chamber 1. The particles 57 gather on the circular wall 13 to form a dense rotating fluidized bed 71 near the inwardly facing rotation imparting device 15. The direction of rotation imparted by the secondary fluid (arrows 67a, 67b and 68a, 68b) is the same as the direction of rotation imparted by the fluid 91.

Treated particles 57 exit the device through the particle outlet 19, and fluid 73a and 73b, treating fluid and secondary fluid, substantially free from particles, exits the device through the central fluid outlet 21a and 21b.

To recuperate heat from the fluid exiting the device, fluid from the central part 21b of the fluid outlet is passed through conduits 88a, 88b and 88c from the fluid outlet to the compressor 86 and from there to the heat exchanger 87 and subsequently to the fluid inlet 36.

An advantage of having split the rotation imparting device into two sections, is that the rotation imparted on the particles and the conditions of the fluid entrained with the particles 57 removed through the particle outlet 19 can be controlled by properly selecting the flow rates and the conditions of the secondary fluid in the section 15b adjacent to the particle outlet 19.

In order to adjust the width of the flow (dashed lines 58) of injected particles 57, the device according to the invention may further be provided with a concentric injection tube 92 opening around the device 33 for injecting particles coaxially into the treating zone 27, which injection tube 92 has a fluid inlet 93. Fluid 95 is supplied through the concentric injection tube 92 and is injected into the treating zone 27 around the flow of particles 57. The fluid supplied through the annular space between the device 33 for injecting particles and the concentric injection tube 92 can be a treating fluid.

By properly selecting the flow rates of the fluids 90, 91 and 95, the spread of the particles 57 leaving the device 33 for injecting particles coaxially into the treating zone 27 can be controlled.

Figure 4:
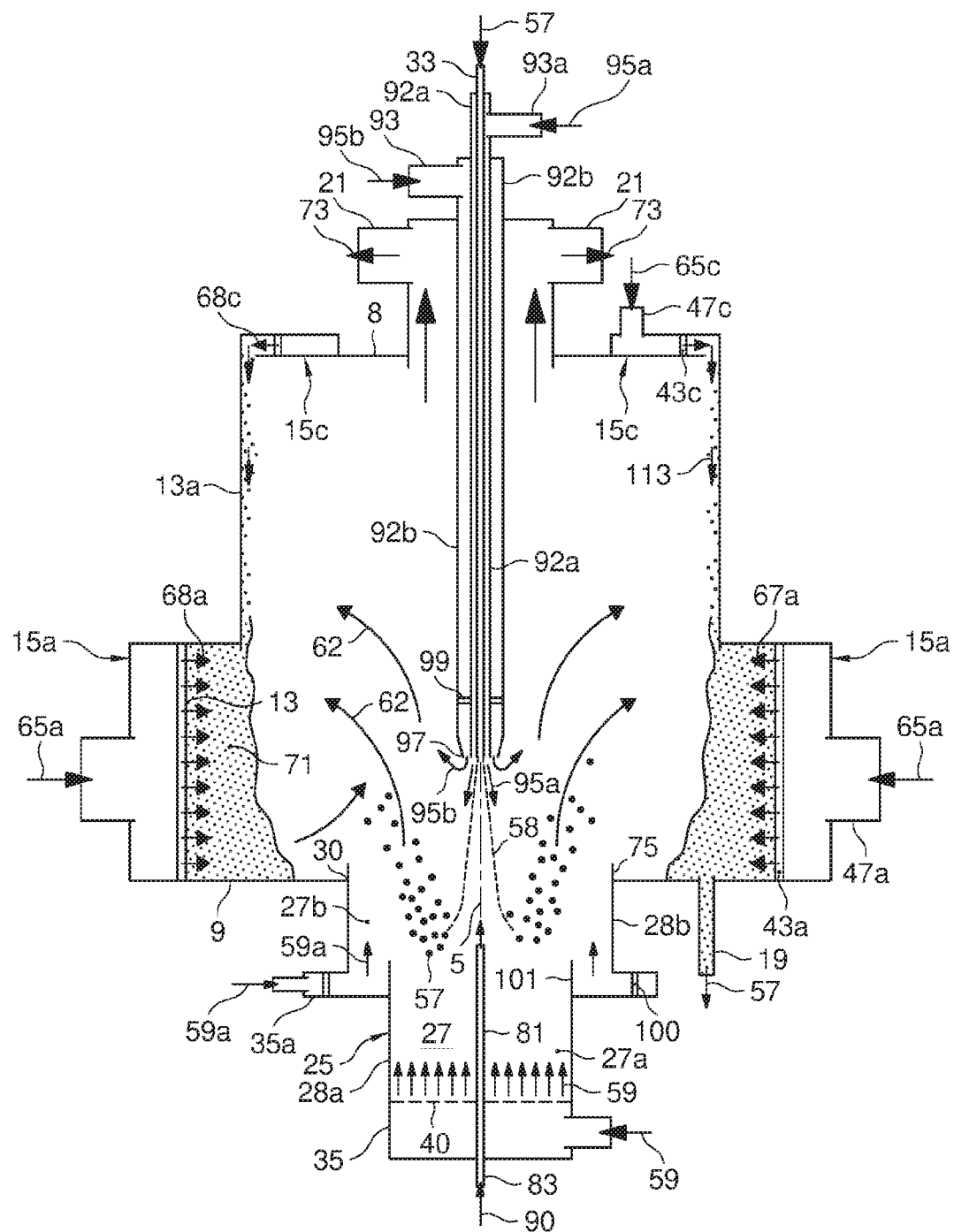
FIG. 4 shows a longitudinal section of a different embodiment than the ones shown in FIGS. 1 and 3.

Reference is now made to FIG. 4. A difference with the embodiment of FIG. 3 that the particles are injected into the device in countercurrent flow with respect to the treating fluid. The rotation imparting device comprises an inwardly facing rotation imparting device 15a, located near the end wall 9, and an axially directing rotation imparting device 15c, located at the opposite end wall 8. The circular wall 13 of the vortex chamber 1 includes a solid wall section 13a that extends between the rotation imparting devices 15a and 15c. In this way the vortex chamber 1 is extended. The inner surface of the inwardly facing rotation imparting device 15a forms an annular section of the circular wall 13. The axially directing rotation imparting device 15c injects during normal operation fluid in mainly tangential direction with respect to the solid wall section 13a, with a radial component directed towards the solid wall section 13a. The solid wall section 13a will guide the fluid flow in axial direction, parallel to the solid wall section 13a. Thus the velocity of the fluid flow exiting the axially directing rotation imparting device 15c has an axial component.

Parts of the device already discussed with reference to the previous Figures have the same reference numeral as in these previous Figures.

A still further difference is that the device 33 for injecting particles coaxially into the treating zone 27 is surrounded by two concentric injection tubes 92a and 92b for feeding fluids 95a and 95b through the annular spaces between them and the device 33. Further, the annular space between the concentric injection tubes 92a and 92b contains near the tip 97, a rotation imparting device 99, so that the fluid flow 95b obtains during normal operation a rotational motion, giving an additional rotational motion around the central longitudinal axis. The rotation imparting device 99 can comprise grooves in an annular ring fixed between the injection tubes 92a and 92b, vanes arranged near the tip 97 in the annular space between the injection tubes 92a and 92b, or a ring arranged in the annular space provided with fluid passages. The grooves, vanes or fluid passages are so arranged as to impart, during normal operation, a rotational motion to the fluid flowing through the annular space.

An additional difference is that the auxiliary chamber 27 is divided in two treating zones, 27a and 27b, defined by circular outer walls 28a and 28b. A second device 35a for feeding treating fluid is located between the two treating zones 27a and 27b. The second device 35a is provided with a rotation imparting device 100 for feeding treating fluid 59a into treating zone 27b in an axial direction with a tangential component.

During normal operation, particles 57 are injected into the treating zone 27 through the device 33 for injecting particles coaxially into the treating zone 27, which device 33 extends from the end wall 8 of the vortex chamber 1 opposite the opening 30. Treating fluid 59 is introduced into the treating zone 27a through the distributor plate 40. Treating fluid 59a is introduced into the treating zone 27b through the second device 35a. The rotation imparting device 100 and a wall 101 impart a rotational motion with an axial component to treating fluid 59a. In this embodiment treating fluids 59a and 59b flow in the direction opposite to the direction of the injected particles 57, in the same way as described with reference to FIG. 1. The centrifugal force of the rotational motion of the fluid 59a generates a pressure gradient facilitating particles penetration into the auxiliary chamber 27 along the longitudinal axis 5 and preventing secondary fluid 65 penetrating into the auxiliary chamber around the rim 75, without significantly driving particles 57 into the treating zone 27b towards the circular outer wall 28b, due to its proximity from the opening 30.

In this embodiment, the tip 97 of the device 33 for feeding particles 57 is at a distance from the auxiliary chamber 27. Suitably the distance between the tip 97 and the end wall 9 is smaller than the largest diameter of the auxiliary chamber 27.

The flow of particles 57 into the treating zone 27 has suitably the form of a cone, dashed line 58, with an angle less than 30°.

To adjust the width of the flow of particles 57, fluid 95a can be supplied through the annular space between the device 33 for injecting particles and the concentric injection tube 92a. Suitably, the fluid 95a is a treating fluid, so as to increase the contact time between the particles and the treating fluids in the treating zone 27.

To make the flow of particles 57 in the treating zone 27 wider, a further fluid 90 can be injected in a direction opposite to the direction of the particles through the tube 83 of the means 81 for widening the flow of particles. In addition, fluid 95b is injected into the annular space between the concentric injection tubes 92a and 92b, the fluid 95b exits the tip 97 in a rotational motion so as to impart a rotational motion around the central longitudinal axis to the flow of particles 57 leaving the treating zone and to keep the particles away from the tip of the injection tubes 92a and 92b.

The particles 57 in the treating zone 27 are intensively mixed with treating fluids 59, 59a and 95a. In order to finish treating the particles 57 and to separate the treated particles from the fluid, the particles are allowed to move into the vortex chamber 1. Secondary fluid is supplied to the fluid inlets 47a and 47c of the rotation imparting devices 15a and 15c and exits the rotation imparting devices 15a and 15c through the fluid feeding means in the form of the slits 43a and 43c so as to impart a rotational motion to the fluid, generating a vortex in the vortex chamber 1. The resulting centrifugal force causes the particles to move in a radial direction towards the circular wall sections 13 and 13a of the vortex chamber 1 formed by the inner surface of inwardly facing rotation imparting device 15a and the solid wall section 13a. The particles 57 gather on the circular wall 13 to form a dense rotating fluidized bed 71 near the rotation imparting device 15a.

The axially directing rotation imparting device 15c at the end wall 8, opening close to the solid wall section 13a, feeds the rotating secondary fluid 65c in a mainly tangential direction with a radial component towards the solid wall section 13a, arrows 67c and 68c, wherein the fluid flow is deflected into axial direction by the solid wall section 13a. In addition to the axial component of the fluid flow exiting the axially directing rotation imparting device 15c, the centrifugal pressure forces an axial motion entraining the particles along the solid wall section 13a, thus preventing the accumulation of particles and the formation of a rotating fluidized bed along the solid wall section 13a. Please note that the accumulation of particles in a rotating fluidized bed significantly slows down the rotational motion in the vortex chamber 1. The solid wall section 13a enables to increase the length of the vortex chamber 1 without significantly reducing the rotational motion. The particles are allowed to slip towards the end wall 9 (arrows 113) along the inner surface of the solid wall section 13a into the dense rotating fluidized bed 71 along the inwardly facing rotation imparting device 15a, near the end wall 9.

The rotations imparted by the fluids are in the same direction.

Treated particles 57 exit the device through the particle outlet 19, and fluid 73, treating fluid and secondary fluid, substantially free from particles, exits the device through the central fluid outlet 21.

An advantage of the extended vortex chamber is that it allows a longer contact time between the particles 57 and the treating fluids 59, 59a and 95a, and a better separation between particles and fluids.

In the embodiment of FIG. 4, the vortex chamber is divided into two separate zones, one zone with the inwardly facing rotation imparting device 15a located near the end wall 9, and one zone with the solid wall section 13a of the circular wall 13 and the axially directing rotation imparting device 15c at the end wall 8. The axially directing rotation imparting device 15c can be replaced by an inwardly facing rotation imparting device similar to the rotation imparting device 15a so that the solid wall section 13a of the circular wall 13 is positioned between two inwardly facing rotation imparting devices (this embodiment is not shown).

Figure 5:
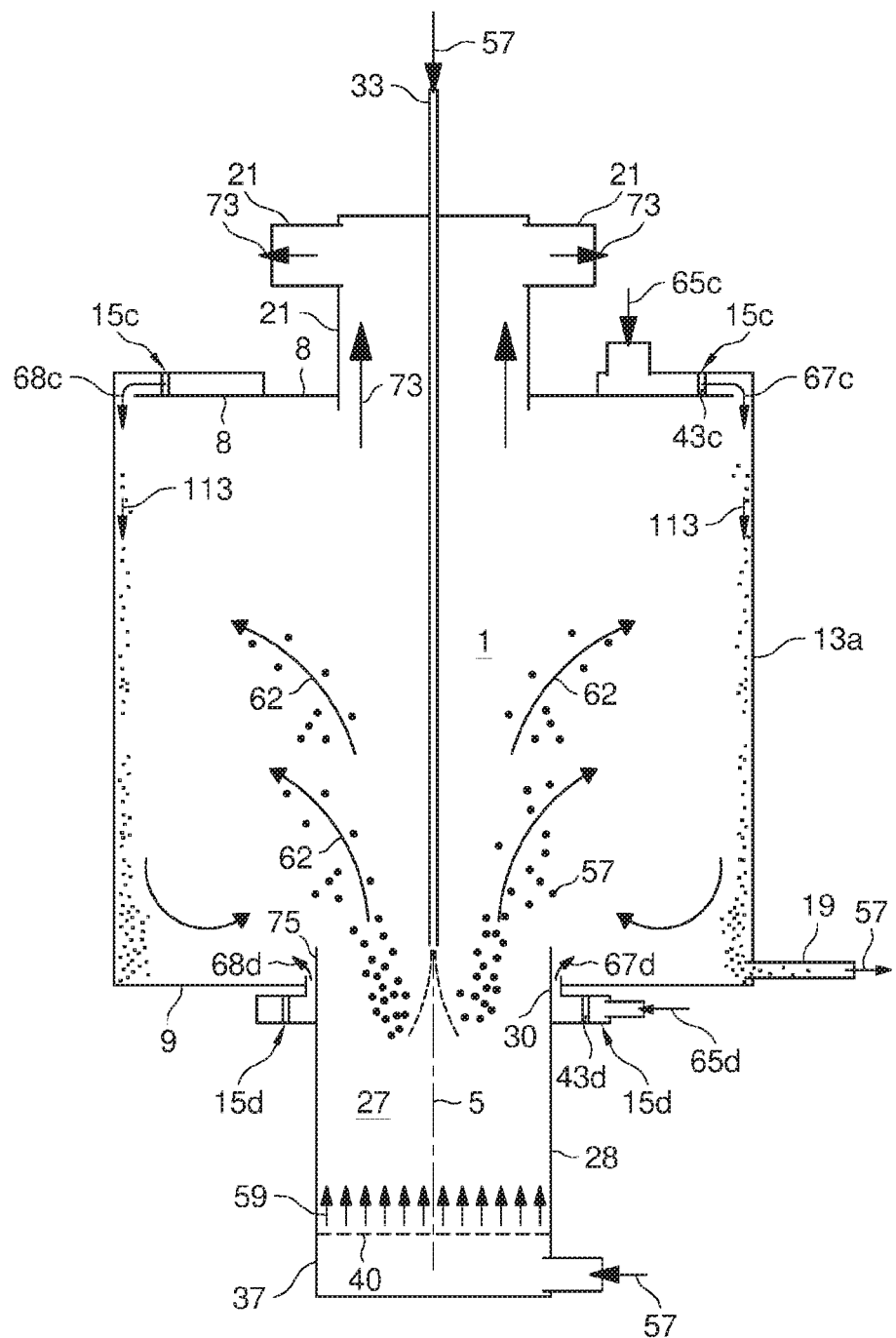
FIG. 5 shows a longitudinal section of a different embodiment than the ones shown in FIGS. 1, 3 and 4.

Reference is now made to FIG. 5 shows a longitudinal section of a different embodiment that the ones shown in FIGS. 1, 3 and 4. Parts of the device already discussed with reference to the previous Figures have the same reference numeral as in these previous Figures.

In the embodiment of FIG. 5, no dense fluidized bed is formed, and the separation of fluid and particles is effected by a swirling motion of fluid flowing out of the axially directing rotation imparting devices 15c and 15d. The axially directing rotation imparting device 15d is located at end wall 9 and around the opening 30 so that it opens around the rim 75. The axially directing rotation imparting device 15c is located at the end wall 8 and opens close to the solid wall section 13a of the circular wall. The solid wall section 13a extends between the axially directing rotation imparting devices 15c and 15d of the rotation imparting device. The axially directing rotation imparting devices 15c and 15d are provided with overlapping vanes with slits 43c and 43d between them.

During normal operation, the particles 57 are injected into the treating zone 27 through the device 33 for injecting particles 57 into the treating zone 27. Treating fluid 59 flows countercurrently with respect to the particles 57. To separate the particles 57 from the fluid, secondary fluid 65c and 65d is supplied to the axially directing rotation imparting devices 15c and 15d, respectively. The directions of the imparted rotations (arrows 67c, 68c, and 67d and 68d) are the same, and the velocities of the fluids exiting the two devices 15c and 15d have an axial component. Particles 57, brought in a rotational motion, move in the direction of the solid wall section 13a of the circular wall of the vortex chamber 1 (arrows 62), where they gather. The particles are allowed to slip towards the end wall 9 (arrows 113) along the inner surface of the solid wall section 13a of the circular wall, driven by the axial component of the flow exiting the axial directing rotation imparting device 15c and by the axial pressure generated by the centrifugal force of the axially directing rotation imparting device 15c. The particles are removed from the vortex chamber 1 through particle outlet 57, which in this embodiment is fixed to the lower part of the circular wall 13, close to the end wall 9.

The means for widening and/or adjusting the width of the flow of injected particles can be included in the embodiment of FIG. 5.

Dense rotating fluidized beds are significantly slowing down the rotational motion. Avoiding the formation of a dense rotating fluidized bed improves the separation of particles and fluid at a reduced energy cost. However, it also reduces the finishing step; therefore this configuration of rotation imparting devices is desirable when the finishing step is less important, or when the total residence time of the particles should be short.

Although gravity can play a positive role, its influence is normally at least one order of magnitude smaller than the centrifugal forces and the drag forces. The device according to the present invention can be used as well in a horizontal position as in a vertical position, and the top and bottom can be inverted.

If contact between particles and a hot wall adversely affects the treating process, the hot wall can be cooled by suitable means (not shown). For example, the secondary fluid may comprise liquefied gas, such as liquefied butane or iso-butane. In the dense rotating fluidized bed, the liquefied gas will evaporate and thus it will cool hot wall and the bed. In addition, the presence of the gas reduces the vapour pressure of undesirable vapours such as water vapour.

The fluid feeding means of the rotation imparting devices can be replaced by ejectors (not shown) pointing in the direction of the slits.

The slits of the axially directing rotation imparting devices can be replaced by fluid feeding means in the form of an annular ring provided with grooves (not shown).

At least part of the area of the distributor plate 40 can be provided with a rotation imparting device (not shown) to impart a rotational motion to the treating fluid 59.

The circular wall 13 and the solid wall section 13a of the vortex chamber 1 and the circular outer wall 28 of the auxiliary chamber 25 can comprise several sections with different diameters and lengths, and different shapes. The shape of the cross-section of a circular wall is a closed loop, for example a circle, or a shape formed by consecutive segments that can be straight or curved lines. In longitudinal direction, the shape of a circular wall can be, for example, a cylinder, a barrel or a frustum of a cone.

Between sections of the solid wall section 13a, rotation imparting devices can be arranged and additional particles outlets. Baffles can be added to concentrate the particles close to the additional solid outlets.

Suitably, the ratio of the area of the opening to the cross-sectional area of the vortex chamber is less than 0.40, more suitably the ratio is in the range of from 0.04 to 0.25 and more suitably in the range of from 0.02 to 0.25.

The length of the auxiliary chamber 25 is suitably larger than its average diameter.

The angle of the frustum of the cone of the auxiliary chamber 25 is suitably less than 30°.

The inwardly facing rotation imparting device shown in FIG. 3 has two sections.

More sections can be included in the vortex chamber 1, wherein the ratio of the total length of the inwardly facing rotation imparting device providing the dense rotating fluidized bed 71 to their diameter is preferably less than 1, and suitably in the range of from 0.1 to 0.7. The sections of the inwardly facing rotation imparting device may be arranged side by side, as shown in FIG. 3, or near the ends of the vortex chamber 1.

The ratio of the length of the vortex chamber 1 to its average diameter is suitably in the range of from 0.3 to 3.0.

The device according to the invention can be used to treat particles, for example to remove water from oil-in-water emulsions, such as milk. In addition, the device according to the invention can be used to coat particles with a coating fluid in the form of a coating liquid. Here the coating fluid can be fed centrally with the particles, or the coating fluid can be sprayed into the treating zone 27, the central zone 72 of the vortex chamber near the central longitudinal axis, or into the rotating fluidized bed 71 through a separate spray nozzle (not shown), or through one of the rotating imparting devices 15.

The fluids may be selected from the group consisting of gases, vapours and liquid. Suitably, the secondary fluid is a gas or a vapour.

As the treating fluid 59 will flow in axial direction towards the central fluid outlet 21, it does not penetrate significantly into dense rotating fluidized bed 71. This enables to have, for example, a very hot treating zone and a less hot central or free vortex zone with a high mass transfer and heat transfer and with a small concentration of particles, a short residence time and a negligible amount of particle to particle collisions. The composition and the temperature of the secondary fluid 65, which traverses the dense rotating fluidized bed 71 before it mixes with treating fluid in the central zone 72, can be optimised to finish the particle treatment. This makes the device according to the invention particularly suitable for drying milk to obtain milk powder, in which case the fluids are gases.

The invention claimed is:

1. A device for treating particles, comprising a vortex chamber defined by end walls at both ends and a circular wall, a rotation imparting device comprising fluid feeder arranged in a mainly tangential direction, a particle outlet and a central fluid outlet, an auxiliary chamber coaxially arranged with the vortex chamber defining a treating zone, the auxiliary chamber having a circular outer wall and an end wall and opens into the vortex chamber through an opening in the end wall of the vortex chamber opposite the central fluid outlet, a device for injecting particles coaxially into the treating zone, and a device for feeding a treating fluid into the treating zone in mainly axial direction towards the auxiliary chamber, wherein the ratio of the area of the opening to the cross-sectional area of the vortex chamber is less than 0.50.

2. The device according to claim 1, wherein the ratio of the area of the opening to the cross-sectional area of the vortex chamber is less than 0.40, suitably in the range of from 0.04 to 0.25 and more suitably in the range of from 0.02 to 0.25.

3. The device according to claim 1, wherein the device for feeding treating fluid into the treating zone is arranged near the end wall of the auxiliary chamber.

4. The device according to claim 1, wherein the auxiliary chamber is divided in two treating zones, defined by two circular outer walls, with circular outer wall arranged between circular outer wall and opening in the end wall, and comprises a first device and a second device for feeding treating fluid, with the first device arranged near the end wall and the second device arranged between circular outer walls, and wherein the second device is provided with a rotation imparting device for feeding treating fluid into treating zone.

5. The device according to claim 1, wherein the device for injecting particles coaxially into the treating zone extends from the end wall of the auxiliary chamber.

6. The device according to claim 1, wherein the device for injecting particles coaxially into the treating zone extends from the end wall of the vortex chamber opposite the opening.

7. The device according to claim 1, further comprising a device for widening the flow of particles introduced into the treating zone.

8. The device according to claim 7, wherein the device for widening the flow of particles includes a pair of concentric injection tubes extending along the central longitudinal axis and opening opposite the device for injecting particles coaxially into the treating zone, which device is provided with a rotation imparting device in the annular space between the injection tubes.

9. The device according to claim 1, further comprising an adjuster for adjusting the width of the flow of particles in the form of a concentric injection tube opening around the device for injecting particles coaxially into the treating zone.

10. The device according to claim 9, wherein the adjuster for adjusting the width of the flow of particles comprises two injection tubes opening around the device for injecting particles coaxially into the treating zone, further provided with a rotation imparting device in the annular space between the injection tubes.

11. The device according to claim 9, wherein the annular space between the device for injecting particles and the concentric injection tube forms a device for feeding a treating fluid into the treating zone.

12. The device according to claim 1, wherein the rotation imparting device comprises an inwardly facing rotation imparting device, which device forms at least one annular section of the circular wall.

13. The device according to claim 12, wherein the inwardly facing rotation imparting device includes overlapping vanes defining slits.

14. The device according to claim 1, wherein the rotation imparting device comprises an axially directing rotation imparting device located at an end wall.

15. The device according to claim 14, wherein the axially directing rotation imparting device includes overlapping vanes defining slits.

16. The device according to claim 1, wherein the rotation imparting device comprises an axially directing rotation imparting device located around the opening.

17. The device according to claim 1, wherein the circular wall includes at least one solid wall section.

18. The device according to claim 17, wherein the solid wall section extends between the axially directing rotation imparting device and the opposite end wall.

19. The device according to claim 17, which comprises an inwardly facing rotation imparting device located near one end wall and an axially directing rotation imparting device located at the opposite end wall, and wherein the solid wall section extends between the two rotation imparting devices.

20. The device according to claim 17, wherein the axially directing rotation imparting device comprises two sections, one arranged at one end wall and the second at the opposite end wall, and wherein the solid wall section extends between the two sections of the axially directing rotation imparting device.

* * * * *